June 2, 1931.     R. MICHL     1,807,698
FINE SPEED GOVERNOR FOR MOTOR ENGINES
Filed May 18, 1925     2 Sheets-Sheet 1

Inventor:
Robert Michl
by:
Marks & Clerk
Attys.

June 2, 1931.  R. MICHL  1,807,698
FINE SPEED GOVERNOR FOR MOTOR ENGINES
Filed May 18, 1925  2 Sheets-Sheet 2
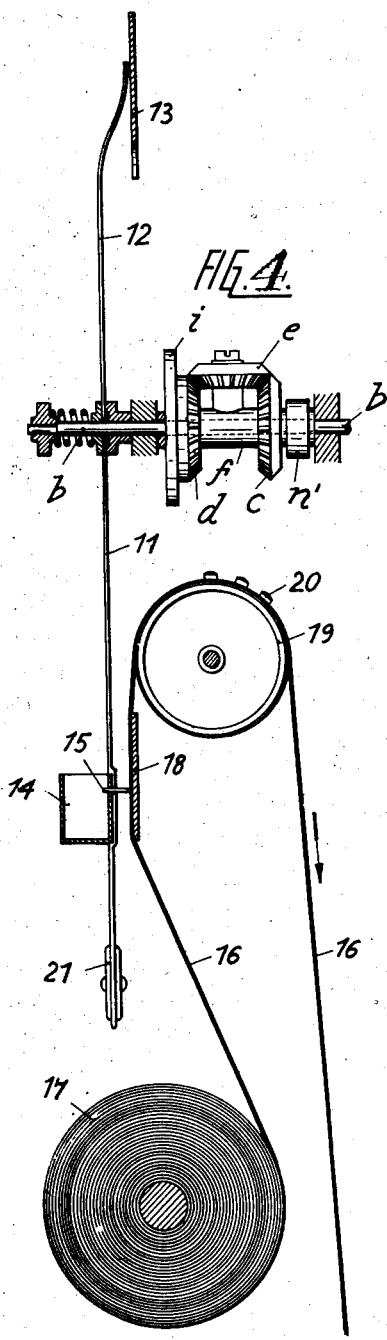
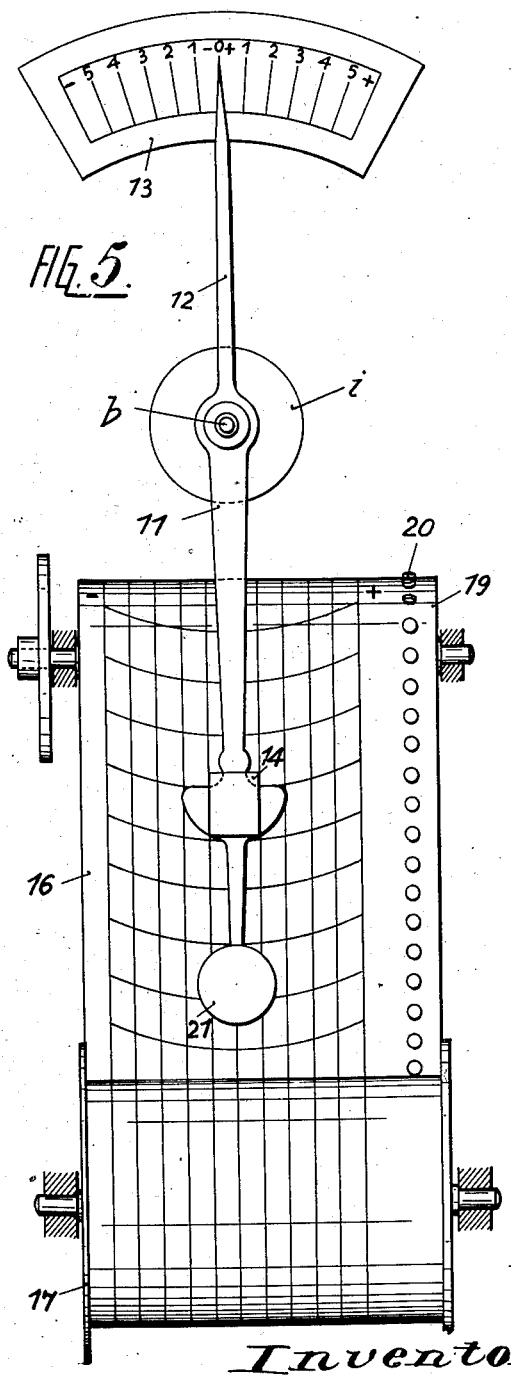

Patented June 2, 1931

1,807,698

UNITED STATES PATENT OFFICE

ROBERT MICHL, OF KOSICE, CZECHOSLOVAKIA, ASSIGNOR, BY MESNE ASSIGNMENTS, TO THE HAMMOND CLOCK COMPANY, OF CHICAGO, ILLINOIS, A CORPORATION OF DELAWARE

FINE SPEED GOVERNOR FOR MOTOR ENGINES

Application filed May 18, 1925, Serial No. 31,186, and in Germany May 26, 1924.

My present invention relates to the automatic regulation of prime movers (such as are in use in electric power generating stations), which are already provided with a speed-governor for the automatic coarse regulation; and more particularly, the purpose of the invention is, to provide for such prime movers and for the alternating current generators driven by them an automatic, fine regulation of their speed, to obtain such uniformity, that the heavy current net-work fed by the A. C. generators is adapted for the immediate and proper drive of clockwork installations, which may be connected thereto. To this effect it is desirable to limit the fluctuations in the frequency of the produced alternative current to fractions of a cycle per second.

For the purpose of effecting such fine regulation according to my invention I provide a differential gear, which I put under the combined control of the heavy current network, and of any suitable standard timepiece, and the resulting movements of this differential gear I use by the mediating means of a relay and of an auxiliary motor for operating the fine regulation of the regulator controlling the prime movers.

It is an important feature in my new and improved regulating device, that in the electric circuit through the shaft of the differential gear and through the relay controlling contacts a periodically acting current interrupter is inserted, which divides the controlling current into single impulses, between which the regulator is given sufficient time, to re-adjust itself to its persistent condition, avoiding thus the oscillating of the regulator above and below its correct position, which is frequently observed in other constructions.

Another characteristic feature of my invention is the use of a particularly designed interrupter inserted in series with the relay actuating circuit; this interrupter is controlled by a speed responsive device in the form of a pendulum regulator rotated by the synchronous motor which drives one side of the differential gearing, and is adapted to open said relay actuating circuit when said motor comes to a standstill, and, furthermore, arresting the standard time-piece in order to stop the differential gearing.

In order to have a permanent and a momentary control for the maintaining by the fine governor of the speed, I prefer to combine with the differential gear an indicating and recording instrument, which indicates, by a hand, deviations from the average speed, and which records the same on a tape. Although this latter construction is not claimed in the present patent application, I have thought it useful to describe it, and to show it in the drawings, for the sake of the completeness of the construction.

In order to make clearer my invention, I shall proceed now to explain by way of example a preferred embodiment, shown in the accompanying drawings, in which all those constructive elements are omitted, which are not essential, to make the invention understood. In the drawings:

Figures 4 and 5 show in side elevation and front elevation the mechanism for indicating and recording the variations in the speed.

Figure 1:
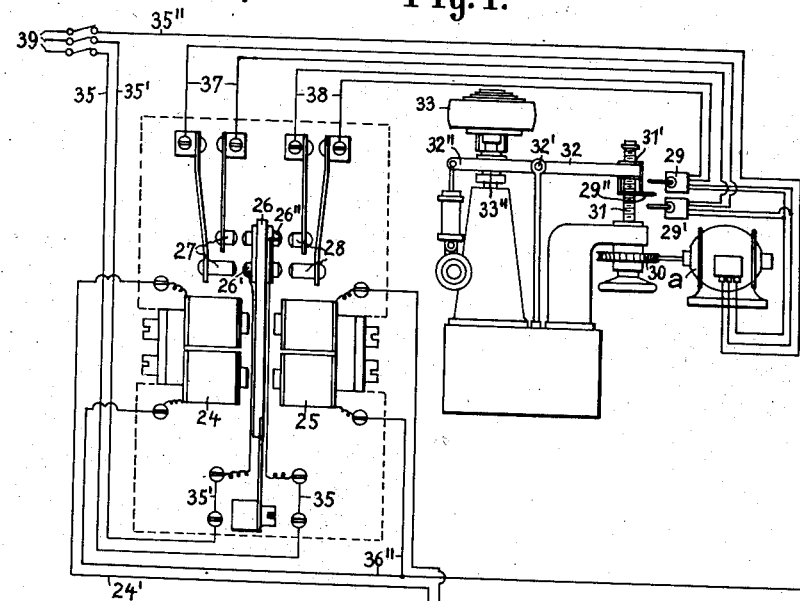
Figure 1 shows the diagram of connections for the rough regulator, its auxiliary motor for the fine regulation, together with the relay and the contact making devices for the control of the relay.
Figure 2:
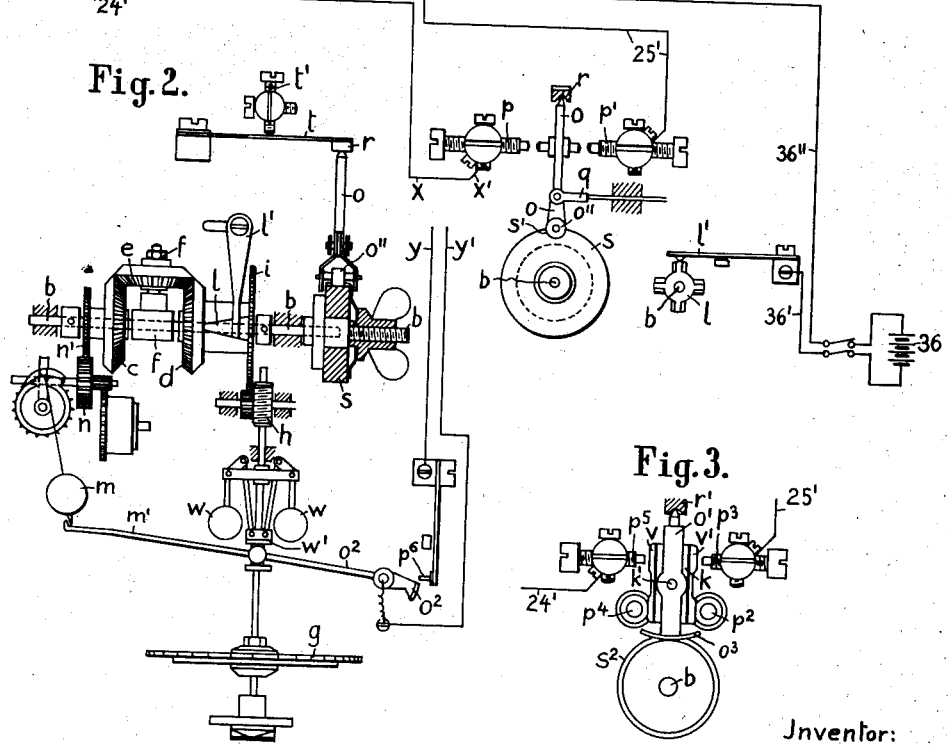
Figure 2 shows mainly in elevation and partly in section diagrammatically the differential gear and the parts controlling its movement.

The differential gearing, shown in Fig. 2, consists of two bevel gears $c$ and $d$ rotatably mounted on the shaft $b$ and of the planetary bevel pinion $e$ rotatably mounted on an arm $f$ which is rigidly connected with the shaft $b$. The main engine to be regulated is, for instance, a generator for alternating current driven by a steam turbine of any known construction the speed of which has to be regulated by the fine speed governor. The one bevel wheel $d$ is electrically driven from the motor-engine to be regulated, for instance by a small synchronous motor, of which only the rotor $g$ is shown in Fig. 2, which may be of the type shown in my Reissue Patent No. 17,779, granted August 26, 1930. The driving motion is transmitted in order to reduce the speed, through the intermediary of a worm- and worm wheel transmission $h$, to the spur gear $i$, and thence to a rotating current-interrupter $l$ built in between the spur wheel $i$ and the bevel gear $d$ in stationary connection, and designed to temporarily interrupt the current supply to the regulating motor $a$ or to the control relay Fig. 1. The bevel gear $c$ is driven through the intermediary of the spur wheels $n$ and $n'$ from a precision clock work, or from a standard time piece of any construction, the drawing indicating diagrammatically a timing device with a pendulum escapement $m$. While the direction of rotation of bevel gear $d$ is opposite that of bevel $c$ the ratio of transmission of these two bevel gears is selected so that the speeds of revolution of the two bevel gears $c$ and $d$ are absolutely equal when the prime mover is operating at the correct speed. In this case the planetary pinion $e$ rotates around its axis only, since it is driven from the two bevel gears $c$ and $d$ in the same direction and at the same speed.

Its position does therefore not change. As soon, however, as the speed of the prime mover lags or leads relative to the speed of the time piece, this difference is expressed by a gyrating movement of the planetary pinion $e$ around the axle $b$ of the two bevel gears $c$ and $d$ which movement, when the revolution of the prime mover lags, is transmitted to the shaft $b$ in the one sense and, when it leads, in the opposite sense of revolution. The contact making parts for controlling the motor $a$ to be described hereinafter can, therefore, be operated from this shaft $b$, in the simplest manner.

In the form of construction of the control-contact mechanism shown in Figs. 1 and 2 the contact lever $o$ is arranged between the two contact screws $p$ and $p'$. It is, however, not mounted on the differential driving shaft $b$, but connected, on the one hand, by a link with the guide lever $q$ and on the other hand, pressed by a pressure bearing $r$ against the circular metal disk $s$ shiftably mounted on the shaft $b$, and normally pressed into the cavity $s'$ of said disk. The pressure is exerted by the spring $t$ (Fig. 2) the tension of which is to be regulated by the pressure screw $t'$. At the lower end of the contact lever $o$ a small metallic roller $o''$ is arranged which rolls on the metal disk $s$ when the disk rotates. At normal service the roller $o''$ of the contact lever $o$ engages with the cavity $s'$ of disk $s$ and is thus electrically connected with the metallic shaft $b$ upon which the temporary current interrupter $l$ is rotatably mounted which produces a periodical current connection by means of spring $l'$.

This spring $l'$ is electrically connected by the line $36'$ to the one side of a low-tension battery or the like $36$, the other side of which is connected by line $36''$ to the electromagnetic coils $24, 25$ of the electric relay, from which other wires $24', 25'$ lead back to the contact screws $p$ and $p'$.

Between the two electromagnets $24$ and $25$ the armature $26$ is built in; this armature carries two contact pins $26'$ and $26''$ which are insulated from one another. The contact pin $26'$ is connected up by a wire $35'$ to the main current supply $39$, as is also the contact pin $26''$ by the wire $35$. Opposite the contact pins are located the pairs of controlling contacts $27$ and $28$, the first pair of which is connected up to the switch $29'$ by means of wires $37$, and the other pair is connected up to the switch $29$ by the wires $38$. From both switches wires run in usual manner to the motor $a$ for the fine-regulation purpose. The motor is, besides, connected up to the main current supply $39$ by a third wire $35''$.

The shaft of the motor $a$ is provided with a worm (not shown) gearing with a worm-wheel $30$, which can be rotated, but not shifted axially, and rotates the spindle $31$ in the one or the other direction according to the direction of rotation of the motor. The spindle carries a nut $31'$ which is axially shiftable, but not rotatable, and is affixed to an end of a double-lever $32$ fulcrumed at the regulator frame on a pivot $32'$. The other arm $32''$ of this lever acts in usual manner upon the regulator $33$ for the fine regulation of this latter.

The working of the new regulating device is as follows: The coarse regulation of the motor engine is effected in the well known usual way by the means of the coarse regulator $33$. The fine regulation is effected by the intermediary of the electric motor $a$, of the relays $24$ to $28$ and of the different mechanisms above described. When a deviation from the normal revolution speed occurs, the difference of speed between the motor $g$ and the time-piece $m$ causes a differential movement of the gears $c, d, e$ and a corresponding rotation of the shaft $b$ with the disk $s$, which will shift the contact lever $o$ to the one or to the other side. As soon as the laterally shifted contact lever $o$ touches the contact $p$ or the contact $p'$, the corresponding electromagnet $24$ or $25$ is inserted into the electric circuit of the battery $36$, which circuit is closed through the contact spring $l'$, the contact $l$, the shaft $b$, the disk $s$ and the lever $o$. If, for instance, the electromagnet $24$ is excited, it will attract the armature $26$. Therefore the plugs $26'$ $26''$ will come to contact with the two plugs $27$, and the current will be closed through the wires $37$ and the switch $29'$, to the electric motor $a$, to drive it in the one direction. The motor $a$, by means of the worm-gear $30$, will rotate the shaft $31$, which screws the end of the lever 32 either up or down, as the case may be, and the displacement of the other end 32" of the lever 32, which swings round the pivot 32' will effect the fine regulation of the regulator 33, by shifting the spindle of the regulator up or down. The arm 32", therefore, is forked and engages the spindle of the regulator in well-known manner. If the differential movement of the shaft $b$ with the disk $s$ is in the opposite direction, the latter would swing the lever $o$ into contact with the contact screw $p'$, then the electromagnet 25 will be excited, and the armature 26, which is attracted by it, will close the electric circuit through the plugs 26', 26", 28, wires 38 and through the switch 29 to the electromotor $a$, turning the latter in the opposite direction, say upward. The motor $a$ in its turn will rotate the shaft 31, and the latter will shift the lever 32 in the opposite direction, which results in a corresponding fine regulation of the regulator 33 and of the motor-engine controlled by the latter.

In the embodiment of the invention shown, the right hand end of the lever 32 is provided further with a trigger or finger 29" which in a well known manner at the end of the upward or downward travel of the lever 32 effects an automatic opening of the switch 29 or 29' respectively, preventing thereby any excess in the working of the fine regulation.

The intermediate periodical current interruper $l$, $l'$ which is inserted in the low voltage circuit serves to give to the regulator during the intervals of current interruption, time to resume the state of inertia and to avoid thereby a periodical opening and closing of the regulator.

If, at great variations of load, the disk $s$ rotates further than the position of the contact screws $p$ and $p'$ permits, the roller of the contact lever $o$ will be pushed out of the cavity $s'$ of disk $s$ when the contact lever has struck against one or the other of these contacts, so that the roller rolls on the circumferential edge of the disk when the disk continues to rotate, the control contact being closed, until, the control element for the driving period for the motor engine having been opened or closed for a sufficiently long time, a backward differential movement of the metal disk $s$ begins and the cavity $s'$ draws the roller and by it the contact lever $o$ along whereby the closed control contact $p$ or $p'$ is interrupted again. Correction is thus made for the cumulative error in the speed of revolution of the prime mover.

Figure 3:
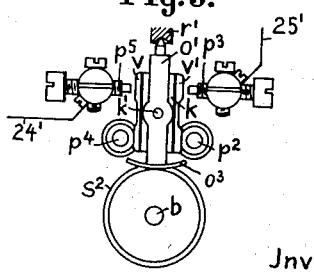
Figure 3 shows a modification of the contact making device shown in the lower part of Fig. 1.

Since in the contact making part as shown in Figs. 1 and 2, the control contact $o$—$p$ or $o$—$p'$ remains closed even during the backward or return rotation of the metal disk $s$, e. g. after the correct revolution speed of the prime mover has been reached or exceeded, it is advisable to insert into the electric connections between the control contacts $p$ and $p'$ and the control relay 24, 25 a contact mechanism as shown in Fig. 3, which upon movement toward the contacts $p^2$—$p^3$—$p^4$—$p^5$ closes the contacts and opens the same upon a backward movement, without interfering with the differential movement of the gearing. This is accomplished according to Figure 3, with the aid of the control lever $o'$, which bears with a broadened shoe $o^3$ on the friction disk $s^2$, and which has a rear abutment in the pressure bearing $r'$. The contact lever $o'$ is covered at its both sides by a layer of insulating material, and on the insulating layers are fixed contact plates $v$, $v'$ in the path of which reach the two contacts $p^4$, $p^2$ respectively. These are connected by wires not shown to the axle $b$. If the movement of the shaft $b$ and of the disk $s^2$ shifts the control lever $o'$ to the right side, then the contact plate $v'$ establishes electric connection between the contact plugs $p^2$ and $p^3$, which, by the means of corresponding leads 25', axle $b$, interrupter $l$, contact spring $l'$, line 36', battery 36 and line 36" close the electric circuit of the right side 25 of the relay for the fine regulation. If the reverse rotation of the shaft $b$ and disk $s^2$ shifts the control lever $o'$ to the left side, then the right side contacts of the plate $v'$ are opened and the left side contact plate $v$ establishes electric connection between the contact plugs $p^4$ and $p^5$, closing thereby the electric circuit by the leads 24" over $b$, $l$, $l'$, 36', 36 and 36" to the left side 24 of the relay for the fine regulation. The contact plates $v$ and $v'$ are rotatably mounted on an intermediate piece $k$ rotatably mounted at $k'$ in the lever $o'$. A secure closing of the contacts is thus obtained.

The adjustability of the duration of the current closing and interrupting is also important for the periodical current interrupter shown in Figs. 1 and 2. The contact surfaces of the rotor $l$ are therefore, as shown in Fig. 2, of varying widths and the contact spring $l'$ is laterally adjustable.

In the current conductors for controlling the motor $a$ or the relay of the same a contact making means $o^2$, $p^6$ (Fig. 2) may further be inserted which, when the synchronous driving motor $g$ is at standstill, is controlled by the auxiliary pendulum regulator $w$ and interrupts the contacts $o^2$, $p^6$ or holds the same closed only during the service. The wires $y$, $y'$ of these contacts are then inserted between the two points $x$, $x'$ of the line 24', so that the current passes through the contacts $o^2$, $p^6$ prior to the contact $p$. By this arrangement any actuation of the fine regulation of the motor engine can be prevented when the synchronous driving motor $g$ is stopped. The pendulum regulator $w$ is mounted on the rotor $g$ of the synchronous motor. The adjusting ring $w'$ is connected with the control lever $o^2$ which maintains the contact with the contact piece $p^6$ only during the service of the synchronous motor $g$ or of the motor engine but interrupts the same when these motors are stopped. In order to avoid an incorrect action when the synchronous motor $g$ should stop, the lever $o^2$ controlled by the pendulum regulator $w$ can be made to engage by means of a prolongation $m'$ with the escapement $m$ of the clockwork so that this lever $o^2$ catches the pendulum $m$ only when the synchronous motor $g$ stops in the swung out position but lets the pendulum swing freely during the service.

The automatic recording of the control proceedings of the driven mechanism may be effected by means of the following mechanism.

On the driving shaft $b$ of the differential gear $c, d, e$ an arm 11 is arranged which is frictionally clamped on the shaft $b$, so that it rotates under normal conditions with the shaft $b$ and yields only when at excessive oscillation damaging of the indicating mechanism might occur. The portion of arm 11 above the shaft $b$ forms a hand 12 moving over a conventional scale 13. At normal service, e. g. medium period number, the hand points always to zero. Only at deviations in the one or other direction it indicates by the amplitude of its movement the increase or decrease of the period number. The lower part of arm 11 carries a writing implement consisting of an ink reservoir 14 and of a stylus 15 moving over a tape 16. This tape winds off a bobbin 17, passes over the abutment 18 and the cylinder 19 to wind up on a bobbin not shown in the drawing. The tape 16 might run off freely. The drive is derived from the cylinder 19 which has pins 20 engaging with perforations of the tape or paper strip 16 so that a reliable driving is ensured. A precision clockwork might be used for driving. The ink reservoir is suspended on the arm 11 and loaded by a counter weight 21 so that it remains always in the perpendicular position so that the ink cannot flow over when the arm executes an oscillation of great amplitude.

I claim:

1. The combination with a coarse regulator for a turbo generator set, a distribution system supplied by the generator set, a fine regulating device for exact speed regulation, a motor for operating said device, a control circuit for said motor, a differential gearing including a planet pinion, a synchronous motor in the system for driving one side of the gearing, a standard time piece for driving the other side of said gearing, a contact lever for closing said circuit, a disk associated with the contact lever and controlling the movement thereof, a current interrupter controlled by the synchronous motor for temporarily interrupting said circuit, as and for the purpose set forth.

2. In combination with a coarse regulator for a turbo generating set, a distribution system supplied by the generator of the set, a fine regulating device for exact speed regulation comprising a differential gearing, a synchronous motor for driving one side of the gearing, a standard time piece for driving the other side of said gearing, a planet pinion included in the gearing, an electric circuit influencing the regulating device, a contact lever in said circuit, a disk associated with the planet pinion controlling the movement of the lever, a current interrupter associated with said circuit for temporarily interrupting the flow of current therethrough, a centrifugal weight driven by the synchronous motor, and contact mechanism in said circuit controlled by said weight.

3. The combination of a coarse speed regulator for a turbo-generator set, a fine regulating device for more nearly exact speed regulation of said turbo-generator set, said device including a reversible motor, a synchronous motor supplied with current from said generator, a differential gearing including a planetary pinion and having one side thereof connected to said synchronous motor, a standard time piece connected to drive the other side of said differential gearing, a disc connected to said planetary pinion so as to be rotated by the revolving movement of the latter, two normally open circuits for controlling said reversible motor and having a common conductor, a contactor operated upon predetermined movement of said planetary pinion in one direction to close one of said circuits and to close the other of said circuits upon a predetermined movement of said pinion in the opposite direction, and means for periodically interrupting the current flow through the common conductor of said circuits.

4. In apparatus for controlling the speed of a turbo-generator set, the combination of a synchronous motor supplied with current from said generator, a standard time piece, a differential gearing having the sides thereof driven respectively by said synchronous motor and said time piece, said differential gearing having an element movable only upon the variation in the speeds of operation of said synchronous motor and said standard time piece, a reversible motor arranged to control the governing of the speed of said turbo-generator, circuits adapted to be closed upon predetermined movement of said gearing element for controlling the direction of rotation of said last-named motor, and adjustable periodically operable means for interrupting said control circuits.

5. In apparatus for controlling the speed of a turbo-generator set, the combination of a synchronous motor supplied with current from said generator, a standard time piece, a differential gearing having the sides thereof driven respectively by said synchronous motor and said time piece, said differential gearing having an element movable only upon a variation in the speeds of operation of said synchronous motor and said standard time piece, a reversible motor arranged to control the governing of the speed of said turbo-generator, circuits adapted to be closed upon predetermined movement of said gearing element for controlling the direction of rotation of said last-named motor, and means responsive to cessation of operation of said synchronous motor to open said control circuits and stop said time piece.

In testimony whereof I affix my signature.

ROBERT MICHL.